(No Model.)

J. B. GENIN.
HOSE COUPLING.

No. 283,771. Patented Aug. 28, 1883.

Witnesses:
W. B. Masson
L. C. Hills

Inventor
John B. Genin
by E. E. Masson
atty.

UNITED STATES PATENT OFFICE.

JOHN B. GENIN, OF WORCESTER, MASSACHUSETTS, ASSIGNOR OF ONE-HALF TO CHARLES N. HAIR, OF SAME PLACE.

HOSE-COUPLING.

SPECIFICATION forming part of Letters Patent No. 283,771, dated August 28, 1883.

Application filed February 14, 1883. (No model.)

*To all whom it may concern:*

Be it known that I, JOHN B. GENIN, a subject of the Queen of Great Britain, residing at Worcester, in the county of Worcester and State of Massachusetts, have invented certain new and useful Improvements in Hose-Couplings, of which the following is a specification.

My invention relates to couplings for hose employed for the conduction of fluids, air, or gases; and it has more particular reference to that class of couplings wherein a projecting flange formed on and extending partially about one member of the coupling is received in a corresponding groove or seat in the other member.

The object of my invention is to so construct the parts that when the usual coupling-ring is operated to unite the members there shall be a wedging action of one part upon another, whereby a perfectly tight jointure of the members is secured.

With this object in view my invention consists in certain features hereinafter described, and specifically set forth in the claims.

Figure 1:
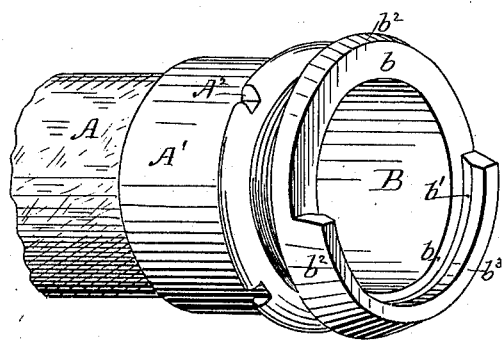
Figure 2:
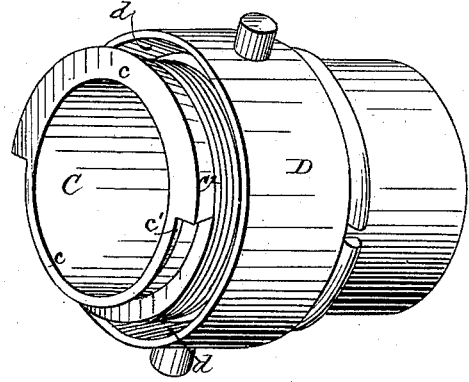
Figure 3:
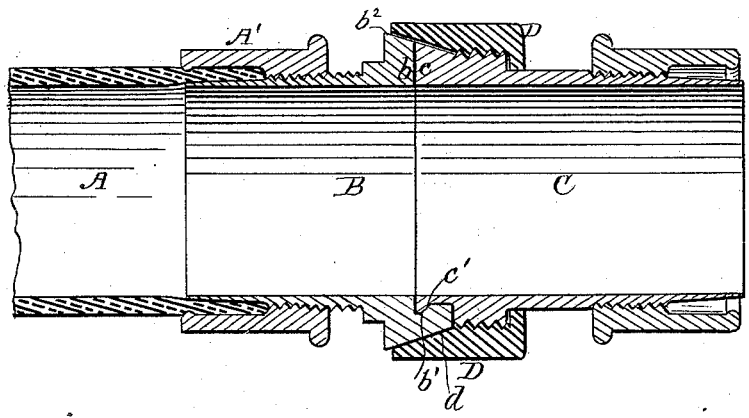
Figure 4:
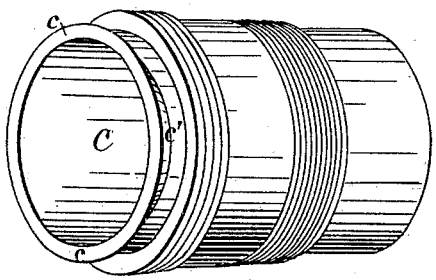
Figure 5:
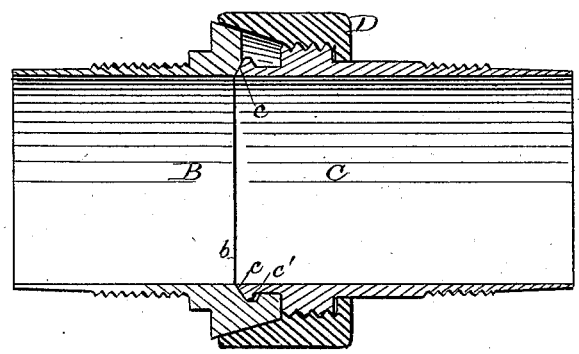

Referring to the accompanying drawings, forming a part hereof, in which like letters of reference indicate like parts in all the figures, Figure 1 is a perspective of one half of the coupler; Fig. 2, a perspective of the other half; Fig. 3, a central vertical section of both united; Fig. 4, a modified form of coupler shown in Fig. 2; and Fig. 5, a modification of the joint portions.

Heretofore in couplings of this class the action of the coupling-ring, so far as I know, has been to draw the parts toward each other in a line or direction parallel with the axis of the parts; but in order to secure the main object of my invention—that is, to produce a wedging action of the parts upon each other—I so shape each with relation to the other that the force of the coupling-ring is not only exerted longitudinally, but also transversely, as hereinafter described, whereby I am enabled to dispense with all yielding and fibrous packing and to substitute ground joints, (although ground joints are not new with hose-couplings,) and thus secure in couplings of this class the well-known advantages of serviceability and security which accompany joints of that character. The coupler, in this instance, is secured to the hose A by a ring, A', in the flange of which are notches $A^2$, by means of which and a suitable wrench the screw is secured upon the rear end of the coupler, so as to bind the hose between the latter and the ring and compress it into the seat thus formed. If desired, any other means may be employed for securing the hose to either or both couplers.

The front end of the coupler proper, B, as illustrated in Fig. 1, is furnished with a plain face or ground-joint surface, $b$, extending half around through the thick portion of the end of the body of the coupler, and throughout the remaining semicircle the ground face is of less width; and adjoining the latter there is an interiorly-beveled or concave surface, $b'$, extending in this semicircle to engage with and retain the projecting angular lip adjoining the ground face of the coupler C. The coupler B has also a semicircular flat face, $b^3$, and a completely circumferential beveled face or joint-surface, $b^2$. The coupler C is a counterpart of the other coupler, and, as shown in Fig. 2, is provided with a plain face, $c$, corresponding to face $b$ of the coupler B, a beveled circular face or angular lip, $c'$, corresponding to the bevel of face $b'$, an exterior semi-circumferential bevel-face, $c^2$, corresponding with and forming, when in a coupled position, a continuation of the conical face $b^2$.

As thus far described, it will be seen that when the lower half of face $c$ is put against the upper half of face $b$ and the coupler C is dropped to a level with coupler B the parts so fit each other that they become hooked together and cannot be disconnected by force exerted in a straight axial line.

The coupler C is provided with a coupling-ring, D, screw-threaded therein, provided with an interior completely circular beveled face, $d$, so that when turned to advance toward the coupler B said face $d$ first operates against the broader lower half of its exterior beveled face, $b^2$, and acts to lift the coupler B, so that its interior beveled face, $b'$, is brought snugly into contact with the lower beveled face, $c'$, of the coupler C. Said interior beveled face, $d$, of the ring D also simultaneously acts upon the broader exterior beveled face, $C^2$, of coupler C, thus furthering the contact of said faces $b'$ $c'$.

Said face $d$ also acts upon the face $b^2$, which being a continuance of the adjacent beveled face $c^2$, constitutes a completely conical exterior face adapted throughout to the bevel of the face $d$ of the ring D, and the final turns of said ring act to firmly bind the parts together and produce thereby a perfect union or joint. The first act of the ring D, therefore, is to compress the parts laterally into position, and by the relative arrangement of the bevels the final action of the ring produces longitudinal draft or pressure of the parts upon each other.

It is apparent that the joint-faces, as illustrated in Figs. 1 and 2, can be fitted to each other with great accuracy; but in order to adapt the said faces to be readily fitted by grinding, turning, or otherwise, the upper thicker portion of coupler C, comprising the broader outer beveled face, $c^2$, and a portion of the outer face, $c$, may, if desired, be formed of a separate piece, secured after finishing it and the remaining faces, by any suitable means; or, as is preferable, and clearly shown in Fig. 4, said upper thick portion may be entirely dispensed with, in which case both couplers may be not only turned in a lathe to truly fit each other, but may be ground together, as usual in the art of making gas and air tight joints.

The terms "upper" and "lower" as used hereinbefore are only relatively so used, as it is apparent that the material point in the construction indicated by said terms may be expressed, broadly, as oppositely-disposed, projecting, beveled, joint-forming faces, without regard to which is the upper or the lower of said faces. In the modification shown in Fig. 5 not only is the upper broader face, $c^2$, of the coupler C removed, but the remaining face $c$ is beveled completely around or conically pointed, so that in connection with the face $c'$, extending completely around, a double-beveled or V-shaped flange is formed around the end of the coupler C. The coupler B is adapted, by having its face $b$ beveled inwardly, to receive the forward beveled face of said flange, so that when connected there are an outer beveled joint extending all around, as before, and an inner beveled ground joint, also extending all around, whereby facility in fitting the joints by turning or by grinding the one upon the other is facilitated.

Having described my invention and its operation, what I claim is—

1. In a hose-coupling of the character described, a coupler provided with oppositely-disposed interior and exterior beveled faces, $b'$ $c'$, respectively, and means for holding said couplers united, substantially as specified.

2. The combination of a coupler, C, having an exterior beveled face, $c'$, a coupler, B, having an interior beveled face, $b'$, and conical outer bearing-surfaces, $b^2$ $c^2$, with a coupling-ring having an interior beveled face, substantially as specified.

3. The combination of the coupler C, having a semicircular narrow exterior beveled face, $c'$, and a semicircular broad exterior beveled face, $c^2$, a coupler, B, having a semicircular narrow interior beveled face, $b'$, and circular exterior beveled face, $b^2$, and a coupling-ring having a circular interior beveled face, substantially as and for the purpose set forth.

4. The combination of a coupler, C, having a circular narrow exterior beveled face, $c'$, a coupler, B, having semicircular interior beveled face, $b'$, and exterior broad and exterior narrow beveled face, $b^2$, with a coupling-ring having a circular interior beveled face, substantially as specified.

5. The combination of coupler B, having the plane faces $b$, interior beveled faces, $b'$, and exterior conical face, $b^2$, with the coupler C, having the beveled face $c'$, and the ring D, having the interior beveled face $d$, substantially as specified.

In testimony whereof I affix my signature in presence of two witnesses.

JOHN B. GENIN.

Witnesses:
    E. E. MASSON,
    W. B. MASSON.